United States Patent
Lee et al.

(10) Patent No.: US 9,703,434 B2
(45) Date of Patent: Jul. 11, 2017

(54) TOUCH SENSING DEVICE AND DISPLAY DEVICE INCLUDING THE SAME

(71) Applicant: Samsung Display Co., Ltd., Yongin (KR)

(72) Inventors: Jeong Heon Lee, Seongnam-si (KR); Sung Ku Kang, Suwon-si (KR); Byeong Kyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 143 days.

(21) Appl. No.: 14/474,997

(22) Filed: Sep. 2, 2014

(65) Prior Publication Data

US 2015/0185912 A1    Jul. 2, 2015

(30) Foreign Application Priority Data

Dec. 30, 2013    (KR) .......................... 10-2013-0167561

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC .......... G06F 3/044; G06F 2203/04103; G06F 2203/04112; H05K 1/0296; H05K 1/0298; H05K 3/10; H05K 3/103; H05K 1/09; H01B 1/00; H01B 1/124; H01B 5/00; H01B 5/14; B32B 7/00; B32B 7/02; B32B 7/04; B32B 7/045
See application file for complete search history.

(56) References Cited

U.S. PATENT DOCUMENTS

| | | | |
|---|---|---|---|
| 7,864,503 B2 | 1/2011 | Chang | |
| 2005/0030048 A1 | 2/2005 | Bolender et al. | |
| 2009/0315859 A1* | 12/2009 | Chien | G06F 3/044 345/175 |
| 2010/0321308 A1 | 12/2010 | Lin et al. | |
| 2012/0114919 A1 | 5/2012 | Nakajima et al. | |
| 2012/0194482 A1 | 8/2012 | Kim et al. | |
| 2013/0087372 A1* | 4/2013 | Nashiki | G06F 3/041 174/257 |
| 2013/0140065 A1* | 6/2013 | Koo | G06F 3/041 174/256 |
| 2013/0255996 A1* | 10/2013 | Akieda | G06F 3/044 174/250 |

(Continued)

FOREIGN PATENT DOCUMENTS

| | | |
|---|---|---|
| JP | 2012-083941 | 4/2012 |
| KR | 10-1025023 | 3/2011 |
| KR | 10-2012-0111787 | 10/2012 |

*Primary Examiner* — Jennifer Mehmood
*Assistant Examiner* — Sardis F Azongha
(74) *Attorney, Agent, or Firm* — H.C. Park & Associates, PLC

(57) ABSTRACT

A touch sensing device includes a touch sensing panel and a sensing signal controller. The touch sensing panel includes sensing electrodes arranged in a matrix. The sensing signal controller is connected to the touch sensing panel via signal transfer wiring. Each sensing electrode includes a first conductive layer and holes formed in the first conductive layer. The first conductive layer includes nano wire.

18 Claims, 9 Drawing Sheets

(56) References Cited

U.S. PATENT DOCUMENTS

| | | | | |
|---|---|---|---|---|
| 2013/0294037 A1* | 11/2013 | Kuriki | ...................... | H05K 9/00 |
| | | | | 361/748 |
| 2014/0085256 A1* | 3/2014 | Chen | ..................... | G06F 3/0412 |
| | | | | 345/174 |
| 2014/0186587 A1* | 7/2014 | Shin | ........................ | H05K 1/09 |
| | | | | 428/172 |

* cited by examiner

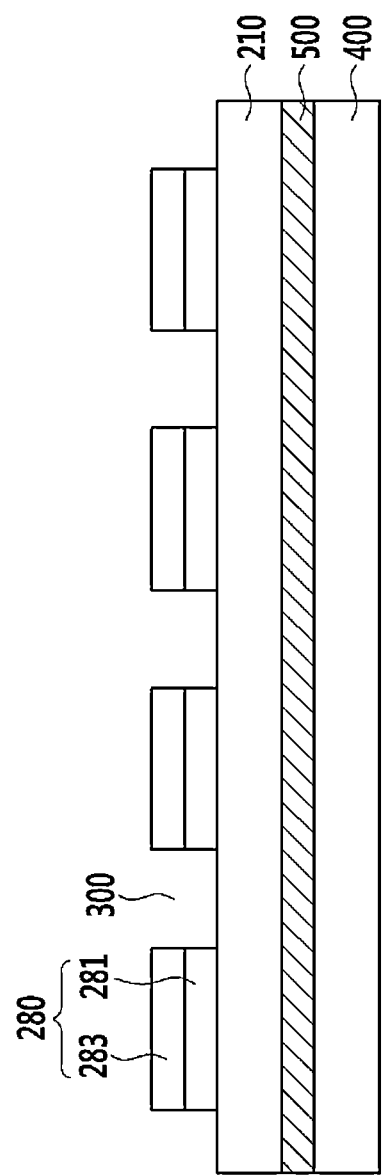

TOUCH SENSING DEVICE AND DISPLAY DEVICE INCLUDING THE SAME

CROSS-REFERENCE TO RELATED APPLICATION

This application claims priority from and the benefit of Korean Patent Application No. 10-2013-0167561, filed on Dec. 30, 2013, which is incorporated by reference for all purposes as if set forth herein.

BACKGROUND

Field

Exemplary embodiments relate to touch sensing devices and display devices including the same, and, more particularly, to touch sensing devices and display devices including the same that are configured to reduce the ability of an observer to recognize a pattern of touch sensing electrodes of the touch sensing device.

Discussion

A display device, such as a liquid crystal display (LCD), an organic light emitting diode (OLED) display, an electrophoretic display, etc., may include a field generating electrode and an electro-optical active layer. An LCD may include a liquid crystal layer as the electro-optical active layer, an OLED may include an organic emission layer as the electro-optical active layer, and an electrophoretic display may include charged particles as the electro-optic active layer. The field generating electrode may be connected to a switching element, such as a thin film transistor, to receive a data signal. The electro-optical active layer may convert the data signal to an optical signal to display an image.

It is noted that these display devices may include a touch sensing function, whereby interaction with a user may be performed, in addition to a function of displaying an image to an observer. The touch sensing function may generate touch information, such as whether an object approaches or contacts a screen and a touch position thereof, by sensing changes in pressure, charge, light, and the like, applied to the screen when, for example, a user writes text, draws figures, etc., when approaching or contacting, for instance, a finger, touch pen, etc., on the screen. The display device may receive an image signal based on the touch information to display an image.

Touch sensing functions may be implemented via a touch sensor. The touch sensor may be classified into various types, such as a resistive-type, a capacitive-type, an electromagnetic (EM)-type, an optical-type, etc. For example, a capacitive touch sensor may include a sensing capacitor including a sensing electrode, which may transfer a sensing signal and sense a change in capacitance of the sensing capacitor generated when a conductor, such as a finger, approaches the touch sensor, to determine the existence of a touch, a touch position, and the like.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensing device and a display device including the same configured to improve a pattern of a touch sensing electrode to prevent external recognition of an observer due to a difference in transmittance and reflectance between materials having different physical properties.

Additional aspects will be set forth in the detailed description which follows, and, in part, will be apparent from the disclosure, or may be learned by practice of the inventive concept.

According to exemplary embodiments, a touch sensing device includes a touch sensing panel including sensing electrodes arranged in a matrix and a sensing signal controller connected to the touch sensing panel via signal transfer wiring. Each sensing electrode includes a first conductive layer and holes formed in the first conductive layer. The first conductive layer includes nano wire.

According to exemplary embodiments, a display device includes a thin film transistor array panel and a touch sensing panel. The thin film transistor array panel includes a thin film transistor. The touch sensing panel faces the thin film transistor array panel. The touch sensing panel includes sensing electrodes arranged in a matrix and a sensing signal controller connected to the touch sensing panel via signal transfer wiring. Each sensing electrode includes a first conductive layer and holes formed in the first conductive layer. The first conductive layer includes nano wire.

According to exemplary embodiments, a touch sensing device and a display device including the same may minimize (or otherwise reduce) the ability of an observer to recognize the pattern of touch sensing electrodes of the touch sensing device via the inclusion of holes in the touch sensing electrodes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

FIG. 7 is a cross-sectional view of a display device including a touch sensing device, according to exemplary embodiments.

DETAILED DESCRIPTION OF THE ILLUSTRATED EMBODIMENTS

Figure 1:
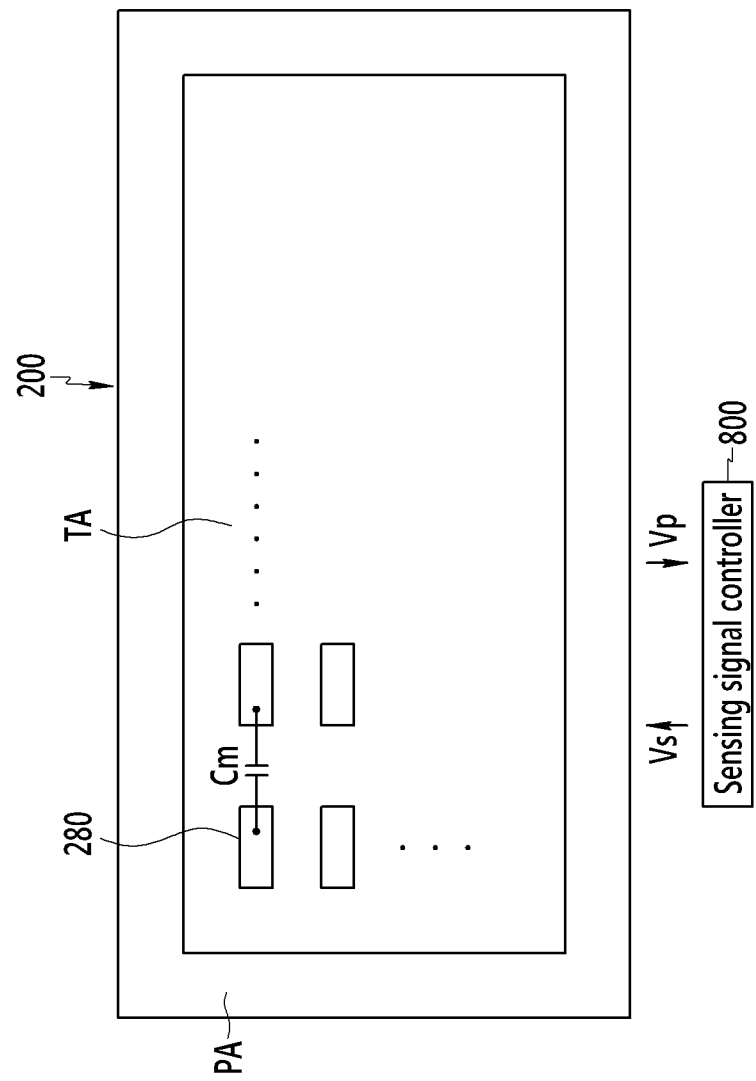
FIG. 1 is a block diagram of a touch sensing device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As used herein, a "hovering touch" is a touch recognized by an indicator, such as a finger or a touch pen, approaching or hovering substantially near a display area DA. A touch recognized, when the indicator, such as a finger or a touch pen, contacts the surface of the display area DA is referred to herein as a "surface touch," unlike a hovering touch. A surface touch may be detected by a touch sensor included in the display device. The touch sensor may be configured to convert pressure applied to a determined point or a change in capacitance generated at the determined point into an electric input signal.

Figure 2A:
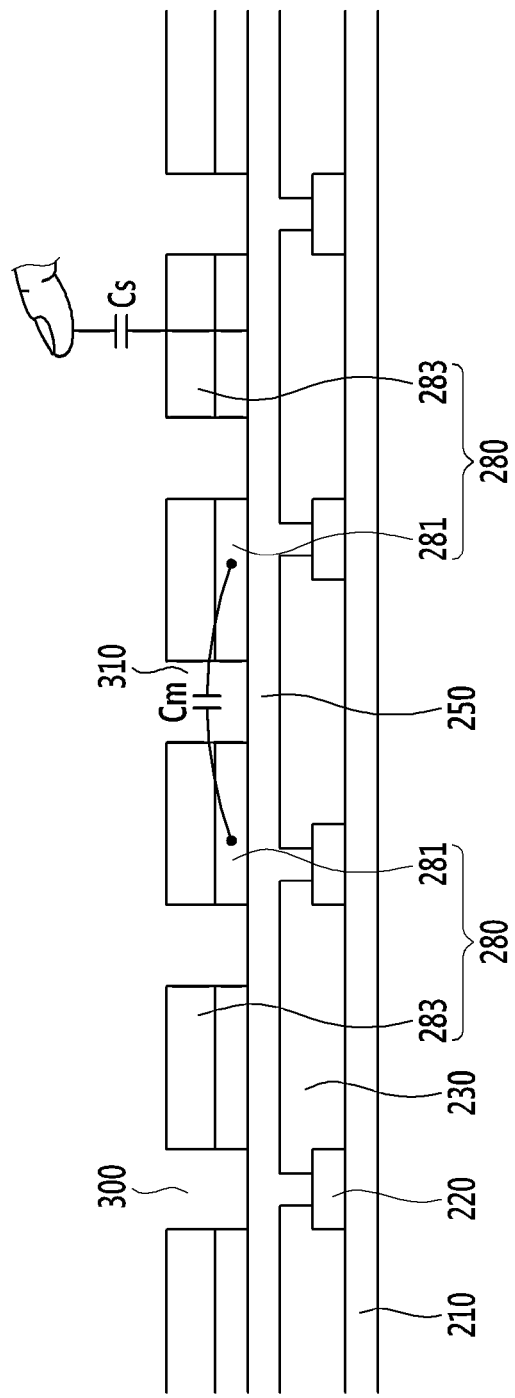
FIG. 2A is a cross-sectional view of the touch sensing device of FIG. 1, according to exemplary embodiments.
Figure 2B:
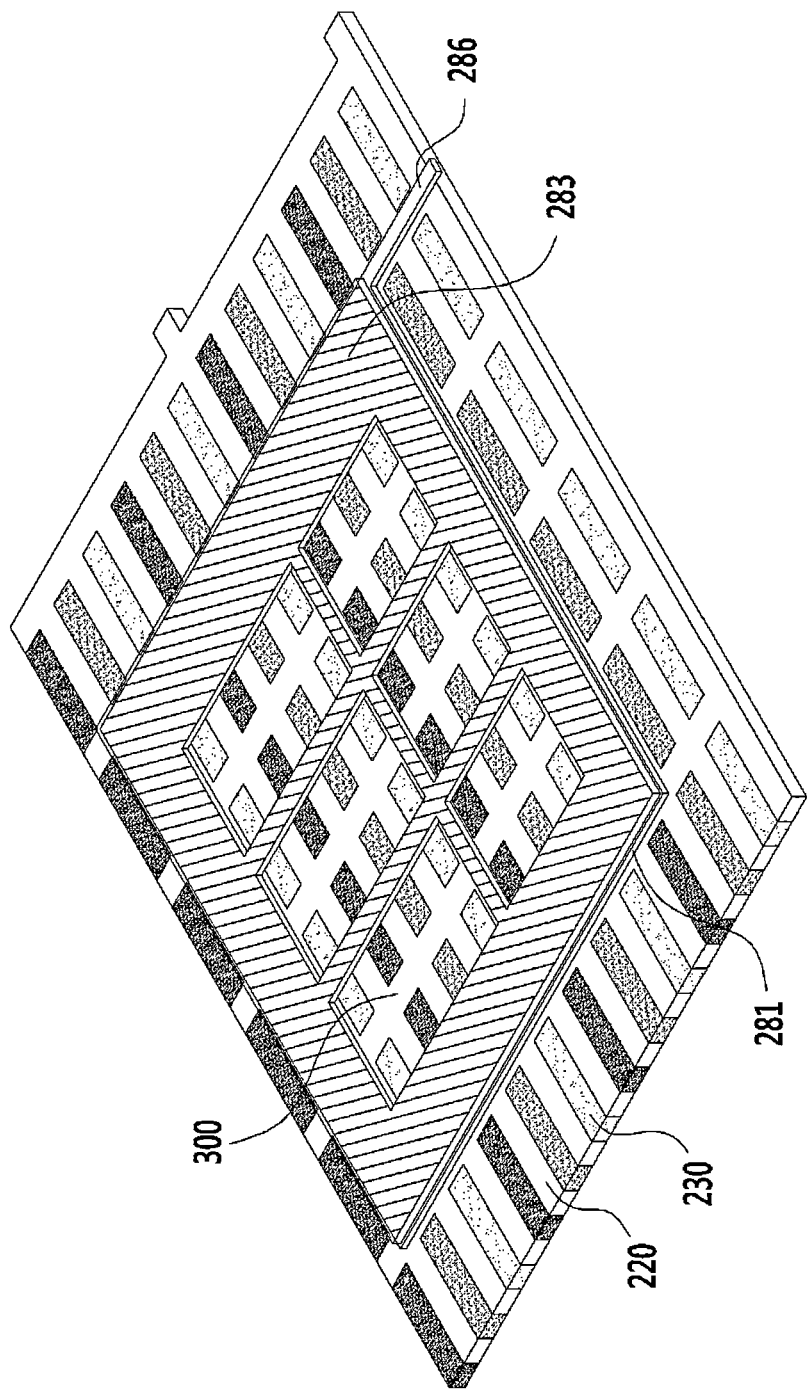
FIG. 2B is a perspective view of the touch sensing device of FIG. 1, according to exemplary embodiments.
Figure 3:
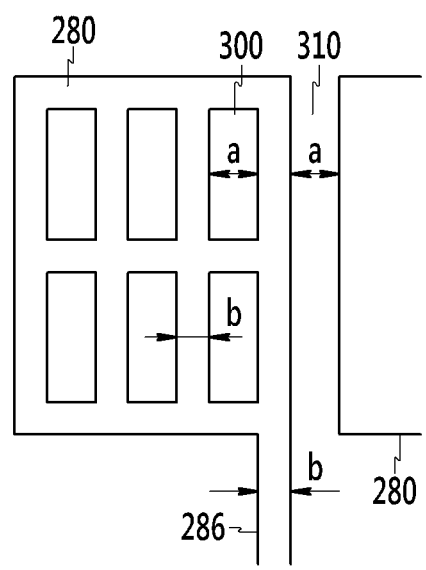
FIG. 3 is a plan view of a unit sensing electrode of the touch sensing device of FIG. 1, according to exemplary embodiments.

FIG. 1 is a block diagram of a touch sensing device, according to exemplary embodiments. FIGS. 2A and 2B are a cross-sectional view and a perspective view of the touch sensing device of FIG. 1. FIG. 3 is a plan view of a unit sensing electrode of the touch sensing device of FIG. 1, according to exemplary embodiments.

Referring to FIG. 1, the touch sensing device is configured to sense hovering touch events and touch events of an external object, such as a finger, stylus, etc. In exemplary embodiments, the touch sensing device includes a touch sensing panel 200, which may be touched or hovered over by the external object, and a sensing signal controller 800 to control the touch sensing features.

According to exemplary embodiments, the touch sensing panel 200 includes a touch area TA and a peripheral area PA disposed outside, e.g., around, the touch area TA. The touch area TA may overlap a display area DA, e.g., an area where an image may be displayed. The peripheral area PA may correspond to a non-display area NDA, e.g., an area where an observer may not perceive the display of an image. The touch area TA is as an area configured to sense a touch when an external object approaches and/or touches the touch sensing panel 200. As such, the "touch" includes a hovering touch when an external object approaches the touch sensing panel 200 or moves while approaching the touch sensing panel 200, in addition to actual touch events where an external object comes in contact with the touch sensing panel 200.

Sensing electrodes 280 and signal transfer wirings 286 are positioned in the touch area TA. The sensing electrodes 280 may be arranged in a matrix, but any other suitable arrangement may be utilized in association with exemplary embodiments described herein. A signal transfer wiring 286 is connected to a sensing electrode 280 to transfer a sensing input signal Vs or a sensing output signal Vp. In this manner, a plurality of signal transfer wirings 286 may extend from the touch area TA and into the peripheral area PA. The signal transfer wirings 286 are connected to the sensing signal controller 800, which may control the transfer of the sensing input signal Vs and/or the sensing output signal Vp. A light blocking member 220, which does not transmit light, may be positioned in the peripheral area PA.

A plurality of sensing electrodes 280 connected to a signal transfer wiring 286 may be considered a touch sensing sensor. The sensing signal controller 800 may be configured to control the touch sensing sensor. In exemplary embodiments, the plurality of sensing electrodes 280 may be arranged in a matrix of n×m, where "n" and "m" are natural numbers. The touch sensing sensor may be configured to sense contact in one or more manners of operation. For example, the touch sensing sensor may be classified into various types, such as a resistive-type, a capacitive-type, an electro-magnetic (EM)-type, an optical-type, etc. For descriptive purposes, a capacitive touch sensing sensor will be described; however, it is contemplated that any suitable touch sensing sensor may be utilized in association with exemplary embodiments described herein.

The sensing signal controller 800 is connected to the sensing electrodes 280 of the touch sensing panel 200. The sensing signal controller 800 transfers a sensing input signal Vs to the plurality of sensing electrodes 280 and receives a sensing output signal Vp from the plurality of sensing electrodes 280. The sensing signal controller 800 processes (or otherwise utilizes) the sensing output signal Vp to generate touch information, such as the existence of the touch and a touch position.

According to exemplary embodiments, when the sensing input signal Vs is input from the sensing signal controller 800 to the sensing electrode 280, a sensing capacitor Cm charged with a determined charge amount by interaction between the plurality of adjacent sensing electrodes 280 may be formed. As referred to herein, the sensing capacitor Cm includes a sensing capacitor formed by adjacent metal electrodes and a sensing capacitor formed by adjacent conductive layers. When the touch of the external object is applied, the charge amount of the sensing capacitors Cm may change, and, as a result, the sensing output signal Vp may be output through the sensing electrode 280. A voltage level of the sensing output signal Vp, in instances where the external object contacts the touch sensing panel 200, may be smaller than a voltage level of the sensing output signal Vp in instances where the object does not contact (e.g., a hovering touch instance) the touch sensing panel 200.

The sensing signal controller 800 receives and samples the sensing output signal Vp and performs analog-to-digital (A/D) conversion (or the like) to generate a digital sensing signal. The sensing signal controller 800 (or a separate determining circuit (not shown)) utilizes the digital sensing signal to generate the touch information, such as the existence of the touch and a touch position. It is contemplated, however, that any other suitable touch information may be generated and/or utilized in association with exemplary embodiments described herein.

In exemplary embodiments, the touch sensing panel 200 may be coupled to a display device (not shown), e.g., an add-on cell type configuration, such that a substrate 210 of the touch sensing panel 200 may be provided separately from a substrate (not illustrated) of the display device. In this manner, the substrate 210 may be disposed on the substrate of the display device. When, however, the sensing electrode 280 is formed on an outer surface of the substrate of the display device (e.g., in an on-cell type configuration) or on an inner surface of the substrate of the display device (e.g., in an in-cell type configuration), the substrate of the display device itself may also function as the substrate 210 of the touch sensing panel 200. For descriptive and illustrative purposes, the touch sensing panel 200 described herein is exemplified as an in-cell type. It is contemplated, however, that the sensing electrodes 280 may be of an on-cell type configuration or an add-on cell type configuration. The touch sensing panel 200 may include substrate 210, in which a color filter 230 and a light blocking member 220 are positioned, as an example, in the in-cell type configuration. It is contemplated, however, that any other suitable configuration may be utilized.

As seen in FIGS. 2A, 2B, and 3, the sensing electrode 280 and the signal transfer wiring 286 are positioned on the substrate 210, which may be made of any suitable transparent material. The light blocking member 220 and the color filter 230 may be positioned on the substrate 210. The substrate 210 may be divided into a display area DA (corresponding to the touch area TA) and the peripheral area PA. In this manner, the display area DA may be provided at a central area of the substrate 210, e.g., where the sensing electrodes 280 are formed so as to recognize a hovering touch or a surface touch of an input means. The peripheral area PA may be formed outside (e.g., at or near) an edge of the touch area TA, e.g., as a portion where the signal transfer wirings 286 apply an electric current to the sensing electrode 280. It is noted that the substrate 210 may be configured having a supporting force able to support the sensing electrodes 280 and the signal transfer wirings 286, as well as configured having transparency so that a user may recognize an image provided via a display device. It is also contemplated that the substrate 210 may be configured to have flexibility.

According to exemplary embodiments, any suitable material may be utilized to form the substrate 210. For example, when considering the supporting force and transparency features of the substrate 210, the transparent substrate 210 may be formed from materials, such as polyethylene terephthalate (PET), polycarbonate (PC), polymethyl methacrylate (PMMA), polyethylene naphthalate (PEN), polyethersulfone (PES), cyclic olefin polymer (COC), a triacetylcellulose (TAC) film, a polyvinyl alcohol (PVA) film, a polyimide (PI) film, polystyrene (PS), biaxially-oriented polystyrene, biaxially-oriented PS containing K-Resin™, bi-oriented PS (BOPS), glass, tempered glass, and/or the like. Again, however, it is contemplated that any other suitable material may be utilized in association with exemplary embodiments described herein.

As previously mentioned, the light blocking member 220 is formed on the substrate 210. The color filter 230 is also formed on the substrate 210 and is exposed by an open region included in the light blocking member 220. That is, the light blocking member 220 may have open regions that are regularly formed therein and the color filter 230 may be positioned in the open regions of the light blocking member 220. It is noted that corresponding portions of the color filter 230 and the light blocking member 220 may overlap one another. In this manner, the color filter 230 may be formed on the light blocking member 220 (as seen in FIG. 2A) or the light blocking member 220 may be formed on the color filter 230. It is also noted that the light blocking member 220 may prevent light interference between adjacent open regions and block external light by dividing the substrate 210 into the plurality of open regions including the color filter 230 disposed therein. An overcoat 250 may be formed on the light blocking member 220 and the color filter 230 to provide a planarized surface.

In exemplary embodiments, the plurality of sensing electrodes 280 may be positioned on the overcoat 250, and, as an example, the plurality of sensing electrodes 280 may be arranged in a matrix. The plurality of sensing electrodes 280 arranged in a matrix may sense a change in charge amount charged in the sensing capacitors Cm to recognize a touch coordinate.

The plurality of sensing electrodes 280 may include a first conductive layer 281 and a second conductive layer 283. Materials of the first conductive layer 281 and the second conductive layer 283 may be different from each other, and, accordingly, capacitance values of a sensing capacitance generated between the first conductive layers 281 and a sensing capacitance generated between the second conductive layers 283 may be different from each other. The first conductive layer 281 serves to recognize the touch coordinate by generating a signal as a result of a hovering touch or a surface touch. The first conductive layer 281 and the second conductive layer 283 are positioned in the touch area TA of the substrate 210.

As illustrated in FIG. 2B, a pattern shape of the first conductive layer 281 may include a plurality of holes 300 of a determined width formed in a horizontal direction and a vertical direction. That is, the first conductive layer 281 may have a determined lattice shape (or configuration) according to the arrangement of the holes 300. In this manner, the holes may be spaced apart from one another in a first lattice extending in a first direction and spaced apart from one another in a second lattice extending in a second direction. In other words, the holes 300 may be arranged in a matrix. It is contemplated, however, that any other suitable arrangement of holes 300 may be utilized in association with exemplary embodiments described herein.

Referring to FIG. 3, the width "a" of the holes 300 may be formed to be the same as the distance "a" between the sensing electrodes 280. The dimension "a" may be formed in a range of 10 to 20 μm, e.g., 12 to 18 μm, such as 14 to 16 μM. The distance "b" between the holes 300 may be the same as the width "b" of the signal transfer wiring 286. The dimension "b" may be formed in a range of 10 to 80 μm, e.g., 20 to 70 μm, such as 40 to 50 μm. Although the holes 300 are illustrated having a rectangular shape, it is also contemplated that the holes 300 may be of any other suitable shape, such as, for example, a circle, a triangle, a trapezoid, a square, etc. It is also contemplated that any suitable number of holes 300 may be formed in the sensing electrodes 280, e.g., formed in the first conductive layer 281 or formed in the first conductive layer 281 and the second conductive layer 283, as will become more apparent below. In this manner, the holes 300 may be sized according to the size of a unit sensing electrode 280, as well as sized in accordance with the number of holes 300 to be included in the unit sensing electrode 280.

A material of the first conductive layer 281 may be a gold (Ag) nano wire (AgNW), but it is contemplated that any other suitable material may be utilized in association with exemplary embodiments described herein. For instance, the material of the first conductive layer 281 may be indium tin oxide (ITO), indium zinc oxide (IZO), carbon nanotubes (CNT), graphene, copper (Cu), metal mesh, conductive polymer, or the like.

According to exemplary embodiments, the first conductive layer 281 receives the sensing input signal Vs from the sensing signal controller 800 to output the sensing output signal Vp. The sensing signal controller 800 processes (or otherwise utilizes) the sensing output signal Vp to generate touch information, such as the existence of the touch and a touch position. When the sensing input signal Vs is input from the sensing signal controller 800, the first conductive layer 281 is charged at a determined charge amount and forms a sensing capacitor Cm with an adjacent first conductive layer 281. When a hovering touch or a surface touch of the external object occurs, a charge amount of the sensing capacitor Cm is changed, and the sensing output signal Vp is output according to the changed charge amount. In this manner, a hovering touch or a surface touch may be sensed.

As seen in FIGS. 2A and 2B, the second conductive layer 283 is positioned on the first conductive layer 281. In this manner, the second conductive layer 283 is formed to cover the first conductive layer 281. As such, a first conductive layer 281 and a second conductive layer 283 may together form a unit sensing electrode 280. The second conductive layer 283 may include holes 300 where the holes 300 of the first conductive layer 281 are formed. It is contemplated, however, that the second conductive layer 283 may have a plate shape, and, thereby, may not include holes 300. In this manner, the second conductive layer 283 may extend into the empty space of the holes 300 formed in the first conductive layer 281. That is, the second conductive layer 283 may contact the first conductive layer 281 and cover an upper portion of the first conductive layer 281.

A material of the second conductive layer 283 may be made of any suitable transparent conductive material, such as, for example, ITO, IZO, CNT, graphene, copper (Cu), metal mesh, conductive polymer, and/or the like. It is contemplated, however, that any other suitable material may be utilized in association with exemplary embodiments described herein.

According to exemplary embodiments, when the sensing input signal Vs is input from the sensing signal controller 800, the second conductive layer 283 forms a sensing capacitor charged at a determined charge amount between adjacent second conductive layers 283. To this end, it is noted that each sensing electrode 280 includes a second conductive layer 283 disposed on a first conductive layer 281. The plurality of sensing electrodes 280 may be divided by second conductive layers 283 being separated from each other. That is, the second conductive layers 283 included in adjacent sensing electrodes 280 are spaced apart from one another by space (or a spacer) 310. As such, each sensing electrode 280 including the first conductive layer 281 and the second conductive layer 283 may form a self-sensing capacitance Cs as a touch sensing sensor. The self-sensing capacitance Cs receives the sensing input signal Vs to be charged at a determined charge amount, and may output a sensing output signal Vp different from the sensing input signal Vs input by a change in charge amount when the hovering touch or surface touch of the external object, such as a finger, exists. In this manner, touch information, such as the existence of the touch and a touch position, may be determined via the changed sensing output signal Vp.

A sensing electrode (without holes 300) in a touch sensing device having a structure including a first conductive layer laminated together with a second conductive layer may include materials in a portion not including the sensing electrode that are different from materials of a portion including the sensing electrode. As such, a pattern of the sensing electrode may be recognized by an observer as a result of a difference in an optical characteristics of these portions, such as optical characteristics affecting transmittance and reflectance of light in a space between adjacent sensing electrodes, e.g., between the portion including the first conductive layer and the second conductive layer and the portion not including the first conductive layer and the second conductive layer.

According to exemplary embodiments, however, sensing electrodes 280 include holes 300 to reduce the ability of an observer to recognize the pattern of the sensing electrodes 280. The holes 300 may be formed in the sensing electrode 280 where the first conductive layer 281 and the second conductive layer 283 are laminated together. The optical characteristics in a space 310 region between the sensing electrodes 280 (e.g., a region not including the first conductive layer 281 and the second conductive layer 283) and partial portions of the sensing electrodes 280 where holes 300 are disposed may be similar to reduce a difference in optical characteristics between the sensing electrode 280 portions and the space 310 region between the sensing electrodes 280. As such, by reducing the difference in optical characteristics between the sensing electrode 280 portions and the space 310 regions between adjacent sensing electrodes 280, the visibility of the pattern of the sensing electrodes 280 may be reduced.

The signal transfer wiring 286 receiving an electric signal (e.g., sensing output signal Vp) from the first conductive layer 281 is positioned at the edge of the first conductive layer 281 and is connected to the first conductive layer 281. The signal transfer wiring 286 may be printed using a screen printing method, a gravure printing method, an inkjet printing method, and/or the like. It is contemplated, however, that any other suitable method may be utilized to form signal transfer wiring 286. In exemplary embodiments, the signal transfer wiring 286 may be made of AgNW having relatively excellent electric conductivity or organic silver. It is contemplated, however, that any other suitable material may be utilized in association with exemplary embodiments described herein, such as, for example, a conductive polymer, carbon black (including CNT), a relatively low resistive metal, e.g., a metal oxide, such as, for instance, ITO, IZO, etc., metals, etc.

According to exemplary embodiments, the sensing signal controller 800 controls the touch sensing sensor. The sensing signal controller 800 may transfer the sensing input signal Vs to the sensing electrode 280 via the signal transfer wiring 286 or receive the sensing output signal Vp from the sensing electrode 280. The sensing signal controller 800 processes (or otherwise utilizes) the sensing output signal Vp to generate the touch information, such as the existence of the touch and a touch position. Although not illustrated, the sensing signal controller 800 may be mounted on a flexible printed circuit film in an integrated circuit (IC) chip that is attached to the touch sensing panel 200 or mounted on a separate printed circuit substrate connected to the touch sensing panel 200. It is contemplated, however, that any other suitable arrangement may be utilized in association with exemplary embodiments described herein.

In exemplary embodiments, the sensing signal controller 800 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. As such, the touch sensing features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the sensing signal controller 800 and/or one or more components thereof may include or otherwise be associated with one or more memories (not shown) including code (e.g., instructions) configured to cause the sensing signal controller 800 and/or one or more components thereof to perform one or more of the touch sensing features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 4:
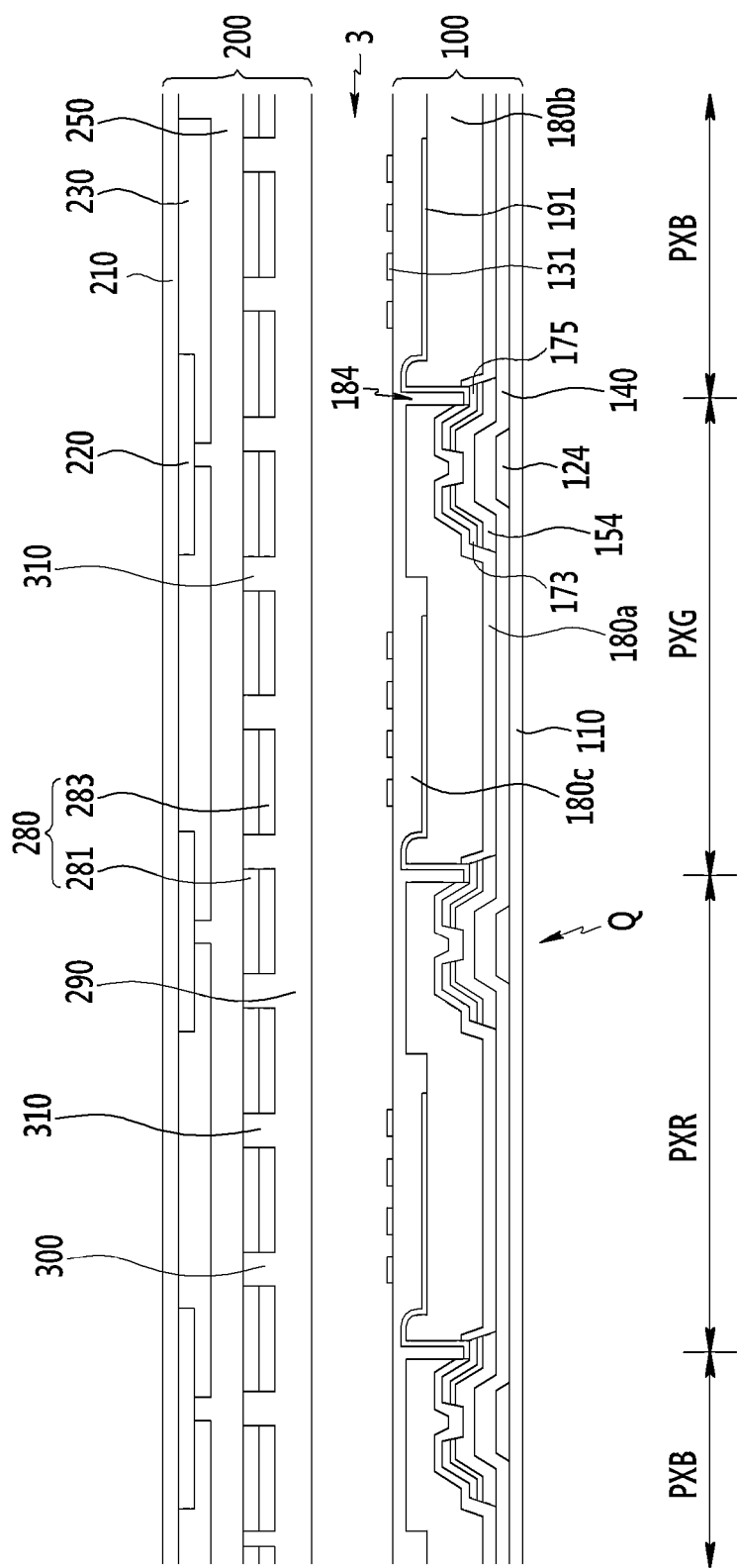
FIG. 4 is a cross-sectional view of a display device, according to exemplary embodiments.

An exemplary display device including the touch sensing device of FIGS. 1-3 will be described with reference to FIGS. 1-4. FIG. 4 is a cross-sectional view of a display device, according to exemplary embodiments. For illustrative purposes, the display device of FIG. 4 is shown as a liquid crystal display device. It is contemplated, however, that any other suitable display device may be utilized in association with exemplary embodiments described herein, such as, for example, an organic light emitting diode display, a plasma display, a field emission display, an electrophoretic display, electrowetting display, other micro-electro-mechanical displays, and the like.

As seen in FIG. 4, the display device includes a lower panel 100 and an upper panel 200 facing each other, and a liquid crystal layer 3 positioned between the lower panel 100 and the upper panel 200. The lower panel 100 may be a thin film transistor array panel, whereas the upper panel 200 may be the touch sensing panel 200 as described above.

The display device includes a display area DA (e.g., an area corresponding to a touch area TA of the touch sensing device of FIGS. 1-3) in which a plurality of pixels PXR, PXG, and PXB displaying an image is positioned and a peripheral area PA positioned around the display area DA. In the peripheral area PA, a driver (not illustrated) for driving the plurality of pixels PXR, PXG, and PXB or a plurality of pad portions (not shown) connected to the driver may be positioned.

The plurality of pixels PXR, PXG, and PXB may be arranged substantially in a matrix, however, it is contemplated that any other suitable arrangement may be utilized. A pixel may include at least one switching element Q connected to a driving signal (or data) line (not shown) and at least one pixel electrode 191 connected to the at least one switching element Q. The switching element Q may include at least one thin film transistor and may be included as part of the lower panel 100. The switching element Q may be controlled according to a gate signal to transfer a data voltage to the pixel electrode 191. Each of the pixels PXR, PXG, and PXB may display a corresponding image according to a data voltage applied to the pixel electrode 191.

To implement a color display, the pixels PXR, PXG, and PXB may display one of the primary colors (e.g., spatial division) and/or display the primary colors with time (e.g., temporal division) so that a desired color may be recognized by the spatial and/or temporal combination of the primary colors. An example of the primary colors may include three primary colors, such as red, green, and blue, or yellow, cyan, magenta, and the like. It is contemplated, however, that any other suitable combination of colors may be utilized. To this end, it is also contemplated that additional colors may be utilized in association with the three colors. A plurality of adjacent pixels PXR, PXG, and PXB displaying different primary colors forms a dot together, and a dot may express a full color, such as white.

Referring to FIG. 4, the lower panel 100 may include a gate electrode 124 positioned on an insulation substrate 110. The gate electrode 124 is connected to a gate line (not illustrated) to receive a gate signal. The gate line transfers a gate signal and mainly extends in a first (e.g., horizontal) direction crossing the data line mainly extending in a second (e.g., vertical) direction. A gate insulating layer 140 is formed on the gate electrode 124. The gate insulating layer 140 may be made of any suitable material, such as, for example, an inorganic insulator, e.g., silicon nitride ($SiN_x$), silicon oxide ($SiO_x$), etc.

In exemplary embodiments, a semiconductor 154 is formed on the gate insulating layer 140. The semiconductor 154 may overlap with the gate electrode 124 and include any suitable material, e.g., amorphous silicon, polysilicon, an oxide semiconductor, etc. A source electrode 173 and a drain electrode 175 facing each other are positioned on the semiconductor 154. The source electrode 173 is connected to the data line (not illustrated) to receive a data voltage. The data line may transfer a data voltage and mainly extends in a second (e.g., vertical) direction to cross the gate line. The drain electrode 175 is separated from the data line. In this manner, the gate electrode 124, the source electrode 173, and the drain electrode 175 form a thin film transistor TFT together with the semiconductor 154. A channel of the thin film transistor is formed in the semiconductor 154 between the source electrode 173 and the drain electrode 175.

As seen in FIG. 4, a first passivation layer 180a is positioned on the source electrode 173, the drain electrode 175, the gate insulating layer 140, and an exposed portion of the semiconductor 154. The first passivation layer 180a may be made of any suitable material, such as, for example, an organic insulating material, an inorganic insulating material, etc. A second passivation layer 180b is positioned on the first passivation layer 180a. The second passivation layer 180b may be made of any suitable material, such as, for instance, an organic material. The second passivation layer 180b may have a flat, upper surface. The second passivation layer 180b may have a different thickness according to a position. The second passivation layer 180b may be omitted.

In exemplary embodiments, the first passivation layer 180a and the second passivation layer 180b may include a contact hole 184 exposing the drain electrode 175. The pixel electrode 191 is formed on the second passivation layer 180b. The pixel electrode 191 may be electrically connected to the drain electrode 175 through the contact hole 184.

According to exemplary embodiments, the pixel electrode 191 may overlap with a common electrode 131 with a third insulating layer 180c disposed therebetween. FIG. 4 illustrates an example in which the common electrode 131 is positioned above the pixel electrode 191, but is not limited thereto. For example, the common electrode 131 may be positioned below the pixel electrode 191, and/or the common electrode 131 may be positioned on the touch sensing panel 200, etc.

As seen in FIG. 4, the pixel electrode 191 is positioned in each of the pixels PXR, PXG, and PXB and has a planar shape. The common electrode 131 overlapping the pixel electrode 191 may include a plurality of branch electrodes overlapping with each pixel electrode 191. The common electrodes 131 positioned in the plurality of pixels PXR, PXG, and PXB are connected to each other to transfer the same common voltage Vcom.

The upper panel 200 may include a light blocking member 220 and a color filter 230 formed on a substrate 210. The substrate 210 may be made of any suitable transparent material, such as, for instance, glass, plastic, etc. The light blocking member 220 may also be referred to as a black matrix, and may prevent light leakage between the pixels PXR, PXG, and PXB. The color filter 230 may display one of the primary colors, such as one of the three primary colors of red, green, and blue. At least one of the light blocking member 220 and the color filter 230 may be positioned on the lower panel 100.

An overcoat 250 covering the color filter 230 and the light blocking member 220 may be positioned on the color filter 230 and the light blocking member 220. When at least one of the color filter 230 and the light blocking member 220 is positioned on the lower panel 100, the overcoat 250 may be omitted.

Referring to FIGS. 1 and 4, the plurality of sensing electrodes 280 may include an end portion (not illustrated) positioned in the peripheral area PA of the display panel. An insulating layer 290 corresponding to the end portion of the sensing electrode 280 may have a contact hole (not illustrated) exposing the end portion. A contact assistant (not illustrated) may be positioned on the end portion of the sensing electrode 280. The contact assistant may be electrically connected with the end portion of the sensing electrode 280 through the contact hole. The end portion of the sensing electrode 280 as a terminal for detecting a sensing voltage may be connected with an external circuit, such as the sensing signal controller 800.

The plurality of sensing electrodes 280 may be positioned on the overcoat 250, and, as an example, the plurality of sensing electrodes 280 may be arranged in a matrix. The plurality of sensing electrodes 280 arranged in a matrix sense a change in charge amount charged in the capacitor Cm to recognize a hovering or surface touch. The plurality of sensing electrodes 280 may include a first conductive layer 281 and a second conductive layer 283. Materials of the first conductive layer 281 and the second conductive layer 283 may be different from each other, and, as such, capacitance values of a sensing capacitance generated between the first conductive layers 281 and a sensing capacitance generated between the second conductive layers 283 may be different from each other. The first conductive layer 281 serves to recognize the touch coordinate by generating a signal as a result of a hovering touch or a surface touch. The first conductive layer 281 and the second conductive layer 283 are positioned in the touch area TA of the substrate 210.

As illustrated in FIG. 2B, a pattern shape of the first conductive layer 281 may include a plurality of holes 300 of a determined width formed in a horizontal direction and a vertical direction. That is, the first conductive layer 281 may have a determined lattice shape (or configuration) according to arrangement of the holes 300. In this manner, the holes may be spaced apart from one another in a first lattice extending in a first direction and spaced apart from one another in a second lattice extending in a second direction. In other words, the holes 300 may be arranged in a matrix. It is contemplated, however, that any other suitable arrangement of holes 300 may be utilized in association with exemplary embodiments described herein.

Referring to FIG. 3, the width "a" of the holes 300 may be formed to be the same as the distance "a" between the sensing electrodes 280. The dimension "a" may be formed in a range of 10 to 20 µm, e.g., 12 to 18 µm, such as 14 to 16 µm. The distance "b" between the holes 300 may be the same as the width "b" of the signal transfer wiring 286. The dimension "b" may be formed in a range of 10 to 80 µm, e.g., 20 to 70 µm, such as 40 to 50 µm.

Although the holes 300 are illustrated having a rectangular shape, it is contemplated that the holes 300 may be of any other suitable shape, such as, for example, a circle, a triangle, a trapezoid, a square, etc. It is also contemplated that any suitable number of holes 300 may be formed in the sensing electrodes 280, e.g., formed in the first conductive layer 281 or formed in the first conductive layer 281 and the second conductive layer 283, as will become more apparent below. In this manner, the holes 300 may be sized according to the size of a unit sensing electrode 280, as well as sized in accordance with the number of holes 300 to be included in the unit sensing electrode 280.

A material of the first conductive layer 281 may be AgNW, but is contemplated that any other suitable material may be utilized in association with exemplary embodiments described herein. For instance, the material of the first conductive layer 281 may be ITO, IZO, CNT, graphene, copper (Cu), metal mesh, conductive polymer, or the like.

According to exemplary embodiments, the first conductive layer 281 receives the sensing input signal Vs from the sensing signal controller 800 to output the sensing output signal Vp. The sensing signal controller 800 processes (or otherwise utilizes) the sensing output signal Vp to generate touch information, such as the existence of the touch and a touch position. When the sensing input signal Vs is input from the sensing signal controller 800, the first conductive layer 281 is charged at a determined charge amount and forms a sensing capacitor Cm with an adjacent first conductive layer 281. When a hovering touch or a surface touch of the external object occurs, a charge amount of the sensing capacitor Cm is changed, and the sensing output signal Vp is output according to the changed charge amount. In this manner, a hovering touch or a surface touch may be sensed.

As seen in FIGS. 2A and 2B, the second conductive layer 283 is positioned on the first conductive layer 281. In this manner, the second conductive layer 283 is formed to cover the first conductive layer 281. As such, a first conductive layer 281 and a second conductive layer 283 may together form a unit sensing electrode 280. The second conductive layer 283 may include holes 300 where the holes 300 of the first conductive layer 281 are formed. It is contemplated, however, that the second conductive layer 283 may have a plate shape, and, thereby, may not include holes 300. In this manner, the second conductive layer 283 may extend into the empty space of the holes 300 formed in the first conductive layer 281. That is, the second conductive layer 283 may contact the first conductive layer 281 and cover an upper portion of the first conductive layer 281.

A material of the second conductive layer 283 may be made of any suitable transparent conductive material, such as, for example, ITO, IZO, CNT, graphene, copper (Cu), metal mesh, conductive polymer, and/or the like. It is contemplated, however, that any other suitable material may be utilized in association with exemplary embodiments described herein.

According to exemplary embodiments, when the sensing input signal Vs is input from the sensing signal controller 800, the second conductive layer 283 forms a sensing capacitor charged at a determined charge amount between adjacent second conductive layers 283. To this end, it is noted that each sensing electrode 280 includes a second conductive layer 283 disposed on a first conductive layer 281. The plurality of sensing electrodes 280 may be divided by second conductive layers 283 being separated from each other. That is, the second conductive layers 283 included in adjacent sensing electrodes 280 are spaced apart from each other by a space (or spacer) 310. As such, each sensing electrode 280 including the first conductive layer 281 and the second conductive layer 283 may form a self-sensing capacitance Cs as a touch sensing sensor. The self-sensing capacitance Cs receives the sensing input signal Vs to be charged at a determined charge amount, and may output a sensing output signal Vp different from the sensing input signal Vs input by a change in charge amount when the hovering touch or surface touch of the external object, such as a finger, exists. In this manner, touch information, such as the existence of the touch and a touch position, may be determined via the changed sensing output signal Vp.

A sensing electrode (without holes 300) in a touch sensing device having a structure including a first conductive layer laminated together with a second conductive layer may include materials in a portion not including the sensing electrode that are different from materials of a portion including the sensing electrode. As such, a pattern of the sensing electrode may be recognized by an observer as a result of a difference in an optical characteristic as those portions, such as optical characteristics affecting transmittance and reflectance of light in a space between adjacent sensing electrodes, e.g., between the portion including the first conductive layer and the second conductive layer and the portion not including the first conductive layer and the second conductive layer.

According to exemplary embodiments, however, sensing electrodes 280 include holes 300 to reduce the ability of an observer to recognize the pattern of the sensing electrodes 280. The holes may be formed in the sensing electrode 280 where the first conductive layer 281 and the second conductive layer 283 are laminated together. The optical characteristics in a space 310 region between the sensing electrodes 280 (e.g., a region not including the first conductive layer 281 and the second conductive layer 283) and partial portions of the sensing electrodes 280 where holes 300 are disposed may be similar to reduce a difference in optical characteristics between the sensing electrode 280 portions and the space 310 region between the sensing electrodes 280. As such, by reducing the difference in optical characteristics between the sensing electrode 280 portions and the space 310 regions between adjacent sensing electrodes 280, the visibility of the pattern of the sensing electrodes 280 may be reduced.

As such, each sensing electrode 280 including the first conductive layer 281 and the second conductive layer 283 may form a self-sensing capacitance Cs as a touch sensing sensor. The self sensing capacitance Cs receives the sensing input signal Vs to be charged by a determined charge amount, and may output a sensing output signal Vp different from the sensing input signal Vs due to a change in charge amount when an external object, such as finger, stylus, etc., executes a hovering touch or a surface touch. As such, touch information, such as the existence of the hovering touch or the surface touch and a touch position, may be determined based on the changed sensing output signal Vp.

The signal transfer wiring 286 receiving an electric signal (e.g., sensing output signal Vp) from the first conductive layer 281 is positioned at the edge of the first conductive layer 281 and is connected to the first conductive layer 281. The signal transfer wiring 286 may be printed by using a screen printing method, a gravure printing method, an inkjet printing method, and/or the like. It is contemplated, however, that any other suitable method may be utilized to form signal transfer wiring 286. In exemplary embodiments, the signal transfer wiring 286 may be made of AgNW having relatively excellent electric conductivity or organic silver. It is contemplated, however, that any other suitable material may be utilized in association with exemplary embodiments described herein, such as, for example, a conductive polymer, carbon black (including CNT), a relatively low resistive metal, e.g., a metal oxide, such as, for instance, ITO, IZO, etc., metals, etc.

According to exemplary embodiments, the touch sensing panel 200 may further include an insulating layer 290 positioned on the plurality of sensing electrodes 280. A liquid crystal layer 3 is positioned between the thin film transistor array panel 100 and the touch sensing panel 200. The liquid crystal layer 3 includes liquid crystal molecules (not illustrated) having dielectric anisotropy. The liquid crystal molecules may be aligned so that long axes thereof are parallel to the display panels 100 and 200 when an electric field is not imposed on the liquid crystal layer 3, and have positive dielectric anisotropy. The liquid crystal molecules may be nematic liquid crystal molecules having a structure in which long axes thereof are spirally twisted from the lower panel 100 to the upper panel 200.

As seen in FIG. 4, the pixel electrode 191, to which the data voltage is applied, generates an electric field in the liquid crystal layer 3 together with the common electrode 131, which receives the common voltage, to determine directions of the liquid crystal molecules of the liquid crystal layer 3 and to effectuate the display of an image.

Although not illustrated, the display device may also include a backlight unit generating light to supply light to the panels 100 and 200. The backlight unit may be included (or otherwise disposed) outside of the substrate 110 of the thin film transistor array panel 100. That is, the substrate 110 may be disposed between the liquid crystal layer 3 and the backlight unit. It is also contemplated that the display device may include a polarization film (not illustrated) attached to an outside of the thin film transistor array panel 100 and an outside of the touch sensing panel 200.

Figure 5:
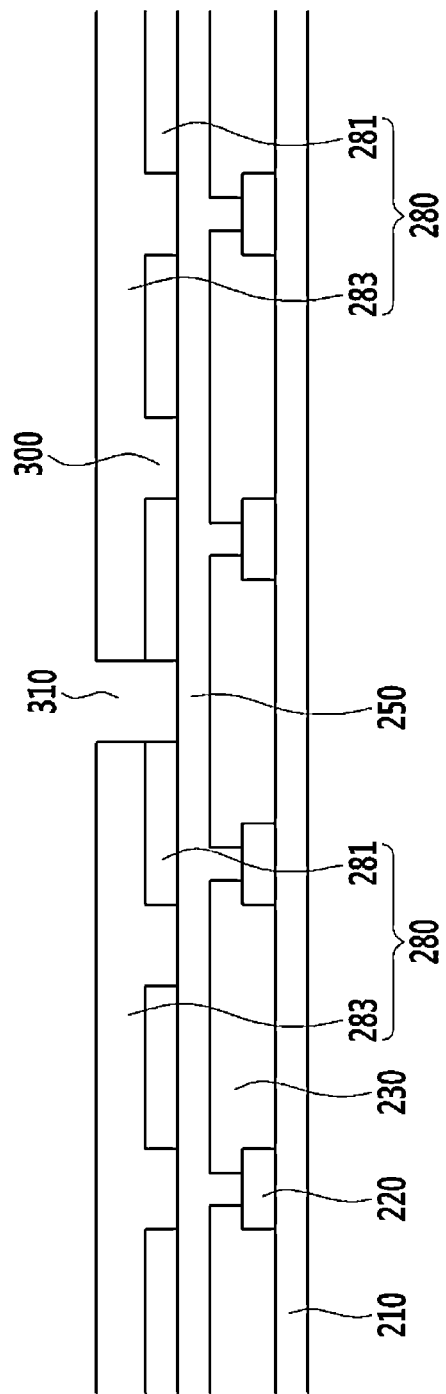
FIG. 5 is a cross-sectional view of a touch sensing device, according to exemplary embodiments.

FIG. 5 is a cross-sectional view of a touch sensing device, according to exemplary embodiments. The touch sensing device of FIG. 5 is substantially the same as the touch sensing device of FIGS. 1 to 3, except that the touch sensing device of FIG. 5 includes an alternative second conductive layer 283. As such, to avoid obscuring exemplary embodiments described herein, duplicated descriptions are omitted.

As illustrated in FIG. 5, the sensing electrode 280 includes the first conductive layer 281 with holes 300 and the second conductive layer 283 formed on an entire (or substantially entire) surface of the first conductive layer 281, such that the second conductive layer 283 fills the holes 300 in the first conductive layer 281. In this manner, a contact region of the first conductive layer 281 may be increased, which may suppress an increase in resistance based on the hole 300 formation of the first conductive layer 281.

Figure 6:
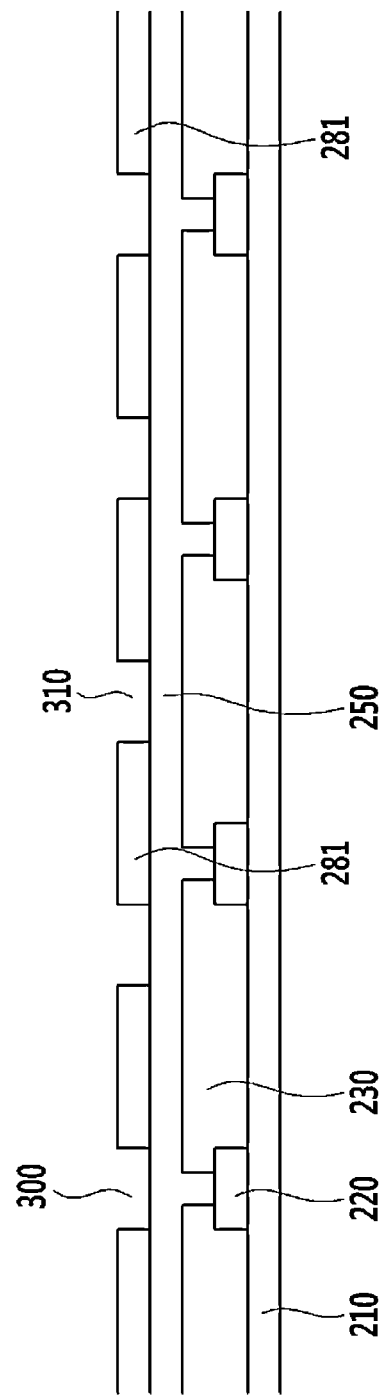
FIG. 6 is a cross-sectional view of a touch sensing device, according to exemplary embodiments.

FIG. 6 is a cross-sectional view of a touch sensing device, according to exemplary embodiments. The touch sensing device of FIG. 6 is substantially the same as the touch sensing device of FIGS. 1 to 3, except that the touch sensing device of FIG. 6 does not include the second conductive layer 283. As such, to avoid obscuring exemplary embodiments described herein, duplicated descriptions are omitted.

FIG. 7 is a cross-sectional view of a display device including a touch sensing device, according to exemplary embodiments. The touch sensing device of FIG. 7 is substantially the same as the touch sensing device of FIGS. 1 to 3, except the touch sensing device of FIG. 7 is an add-on cell type touch sensing device. As such, to avoid obscuring exemplary embodiments described herein, duplicated descriptions are omitted.

As illustrated in FIG. 7, the display device includes a substrate 210 and a touch sensing device in which holes 300 are formed in the sensing electrode 280. The sensing electrode 280 includes the first conductive layer 281 and the second conductive layer 283 formed on the substrate 210. The sensing electrode 280 is coupled to a display panel 400 through an adhesive member 500.

Figure 8A:
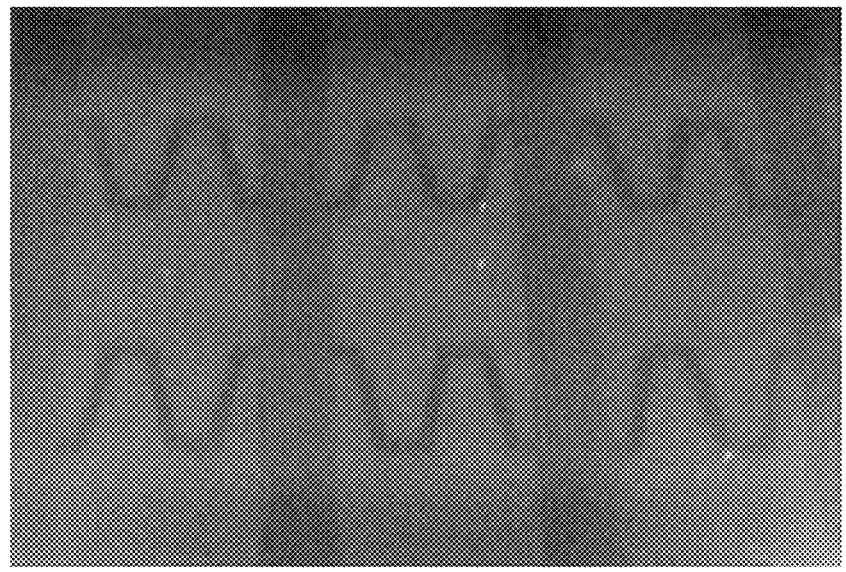
FIG. 8A is a photograph demonstrating a degree of recognition of sensing electrode patterns of a comparative touch sensing device.
Figure 8B:
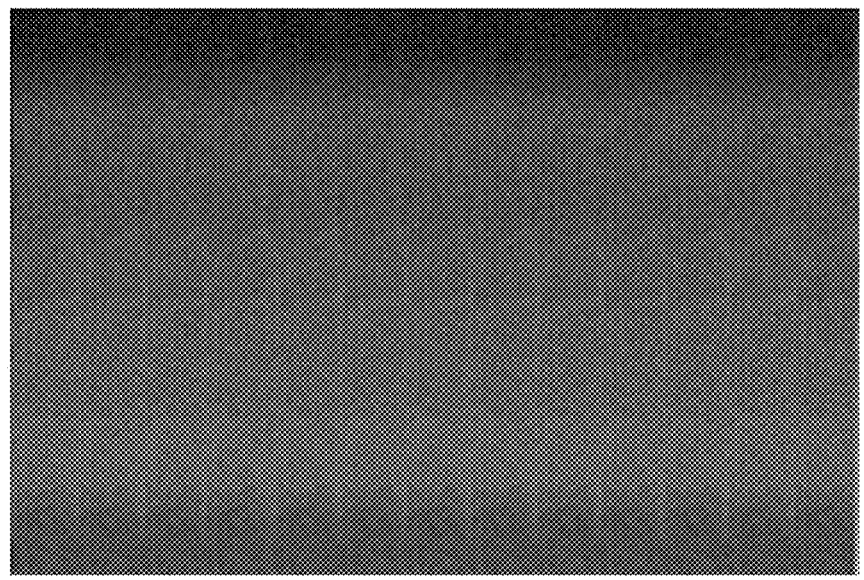
FIG. 8B is a photograph demonstrating a degree of recognition of sensing electrode patterns in a touch sensing device, according to exemplary embodiments.

A degree of recognition of sensing electrode patterns of a touch sensing electrode according to exemplary embodiments and a comparative touch sensing electrode without holes is measured with the naked eye and illustrated in FIGS. 8A and 8B.

FIG. 8A is a photograph demonstrating a degree of recognition of sensing electrode patterns of a comparative touch sensing device. FIG. 8B is a photograph demonstrating a degree of recognition of a touch sensing electrode pattern according to Example of the present invention.

As can be seen between FIGS. 8A and 8B, it is apparent that the comparative touch sensing electrodes are much more visible than the touch sensing electrodes accordance to exemplary embodiments described herein.

According to exemplary embodiments, a touch sensing device including touch sensing electrodes with holes may reduce (or minimize) the visibility of the touch sensing electrode patterns to an observer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensing device, comprising:
a touch sensing panel comprising sensing electrodes arranged in a matrix; and
a sensing signal controller connected to the touch sensing panel via signal transfer wiring,
wherein each sensing electrode comprises:
a first conductive layer; and
a second conductive layer disposed directly on and contacting the first conductive layer,
wherein the first conductive layer comprises nano wire,
wherein a material of the first conductive layer is different than a material of the second conductive layer,
wherein the material of the first conductive layer comprises metal and the material of the second conductive layer comprises a transparent conductive material, and
wherein the first conductive layer has holes formed therein such that recognition of a pattern of the sensing electrodes is reduced.

2. The touch sensing device of claim 1, wherein the holes are formed in the first conductive layer in a matrix.

3. The touch sensing device of claim 2, wherein a width of each hole is the same as a distance between adjacent sensing electrodes.

4. The touch sensing device of claim 3, wherein the width is 10 to 20 μm.

5. The touch sensing device of claim 3, wherein a distance between adjacent holes is the same as the width of the signal transfer wiring.

6. The touch sensing device of claim 5, wherein the distance between adjacent holes is 10 to 80 μm.

7. The touch sensing device of claim 1, wherein, in a plan view, the shape of each hole forms one of a quadrangle, a circle, a triangle, and a trapezoid.

8. The touch sensing device of claim 1, wherein:
the first conductive layer comprises silver nano wire; and
the second conductive layer comprises one of indium tin oxide and indium zinc oxide.

9. The touch sensing device of claim 1, wherein:
a width of each hole is the same as a distance between adjacent sensing electrodes; and
the width each hole is 10 to 20 μm.

10. The touch sensing device of claim 9, wherein:
a distance between adjacent holes is the same as the width of the signal transfer wiring; and
the distance between adjacent holes is 10 to 80 μm.

11. The touch sensing device of claim 1, wherein the second conductive layer extends into the holes of the first conductive layer.

12. The touch sensing device of claim 1, wherein the touch sensing panel further comprises:
a substrate;
a light blocking member disposed on the substrate, the light blocking member comprising an opening; and
a color filter disposed on the substrate and in the opening.

13. The touch sensing device of claim 12, wherein the sensing electrodes are disposed on the light blocking member and the color filter.

14. A display device, comprising:
a thin film transistor array panel comprising a thin film transistor;
a touch sensing panel facing the thin film transistor array panel, the touch sensing panel comprising sensing electrodes arranged in a matrix; and
a sensing signal controller connected to the touch sensing panel via signal transfer wiring,
wherein each sensing electrode comprises:
a first conductive layer; and
a second conductive layer disposed directly on and contacting the first conductive layer,
wherein the first conductive layer comprises nano wire,
wherein a material of the first conductive layer is different than a material of the second conductive layer,
wherein the material of the first conductive layer comprises metal and the material of the second conductive layer comprises a transparent conductive material, and
wherein the first conductive layer has holes formed therein such that recognition of a pattern of the sensing electrodes is reduced.

15. The display device of claim 14, wherein:
the first conductive layer comprises silver nano wire; and
the second conductive layer comprises one of indium tin oxide and indium zinc oxide.

16. The display device of claim 15, wherein:
a width of each hole is the same as a distance between adjacent sensing electrodes; and
a distance between adjacent holes is the same as the width of the signal transfer wiring.

17. The display device of claim 14, wherein, in a plan view, the shape of each hole forms one of a quadrangle, a circle, a triangle, and a trapezoid.

18. The display device of claim 14, wherein the second conductive layer extends into the holes formed in the first conductive layer.

* * * * *